March 2, 1965   E. W. ECKEY   3,171,600
LIQUID SPRAYING APPARATUS
Filed Dec. 31, 1962   4 Sheets-Sheet 1
Fig. 1.
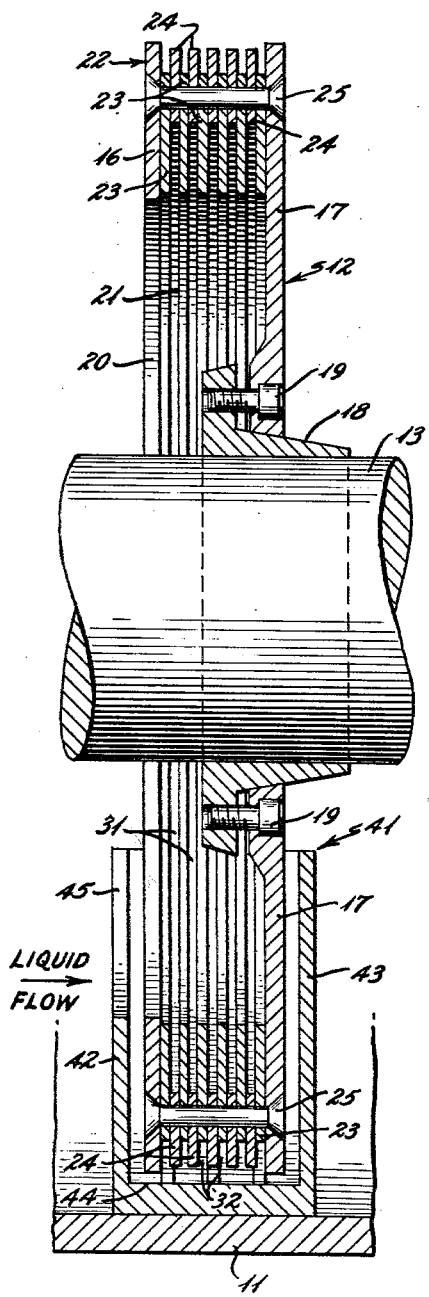
Fig. 2.
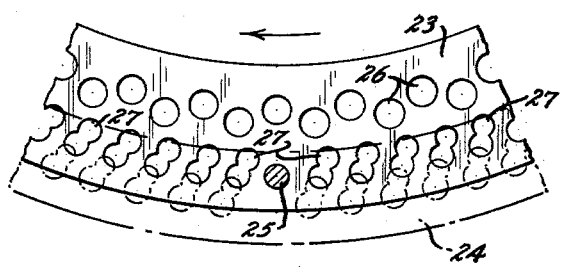
Fig. 3.
Fig. 4.
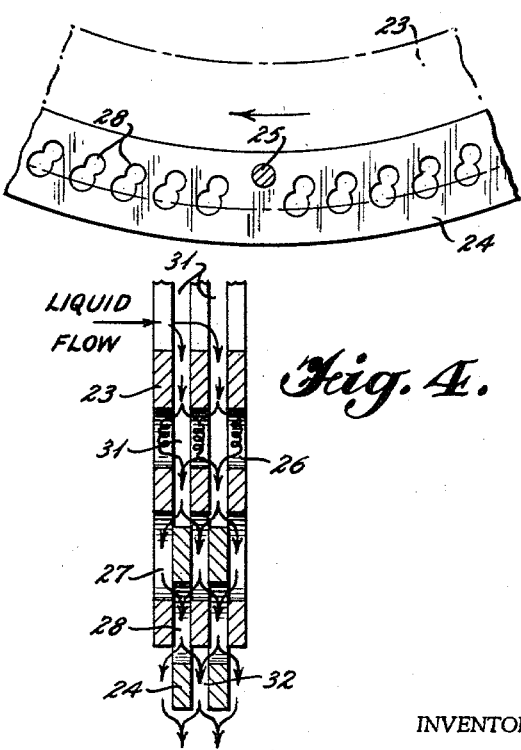
INVENTOR
Eddy W. Eckey
BY
Shoms, Birch, Swindler & McKie
ATTORNEYS March 2, 1965 E. W. ECKEY 3,171,600

LIQUID SPRAYING APPARATUS

Filed Dec. 31, 1962 4 Sheets-Sheet 2

INVENTOR
Eddy W. Eckey

BY
Irons, Birch, Swindler & McKie
ATTORNEYS

March 2, 1965  E. W. ECKEY  3,171,600
LIQUID SPRAYING APPARATUS
Filed Dec. 31, 1962  4 Sheets-Sheet 3
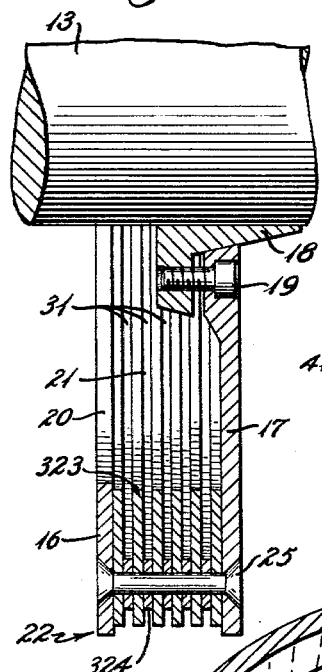
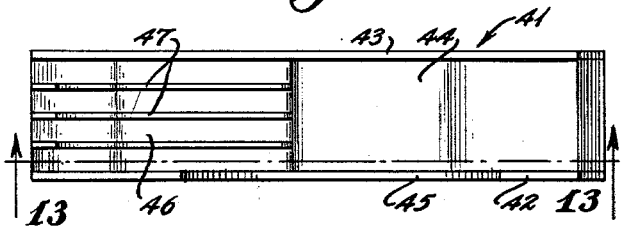
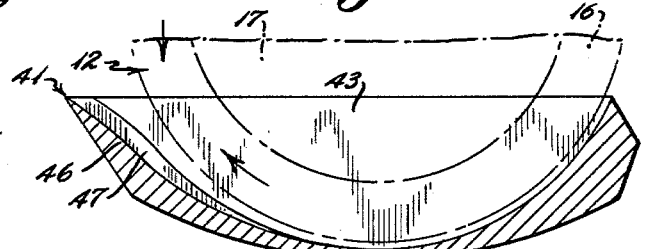
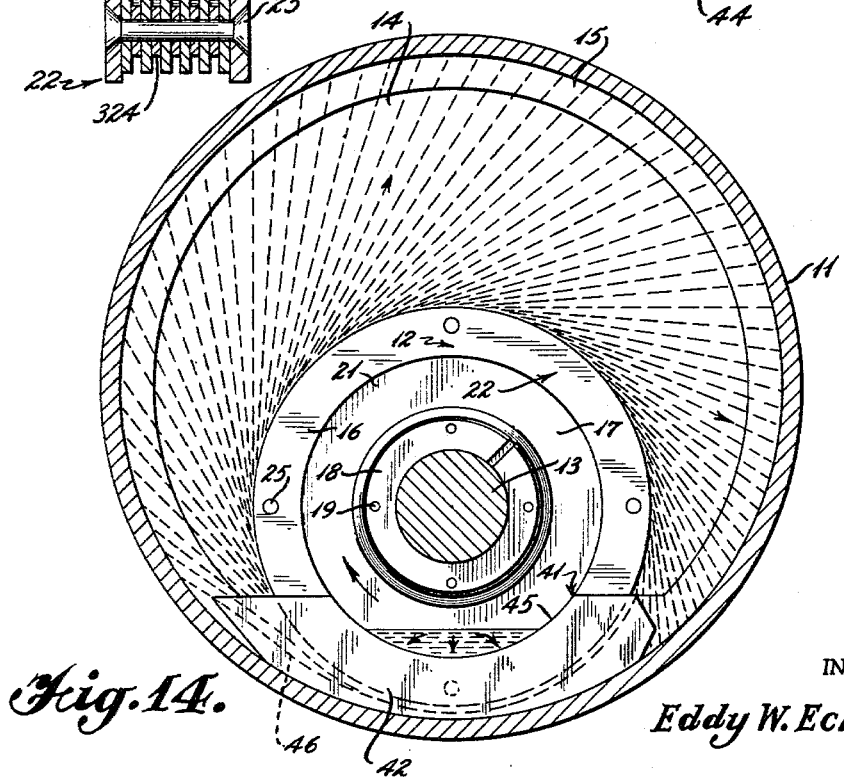
INVENTOR
Eddy W. Eckey
BY
ATTORNEYS March 2, 1965 E. W. ECKEY 3,171,600
LIQUID SPRAYING APPARATUS
Filed Dec. 31, 1962 4 Sheets-Sheet 4

INVENTOR
*Eddy W. Eckey*

BY *Irons, Birch, Swindler & McKie*
ATTORNEYS

# United States Patent Office 3,171,600
Patented Mar. 2, 1965

3,171,600
LIQUID SPRAYING APPARATUS
Eddy W. Eckey, 313 S. Wayne Ave., Cincinnati, Ohio
Filed Dec. 31, 1962, Ser. No. 248,578
19 Claims. (Cl. 239—220)

This invention relates to liquid spraying apparatus and more particularly to such apparatus utilizing rotatable impellers for centrifugally projecting a spray of liquid.

This application is a continuing application based in part on my co-pending application Serial No. 216,008, filed July 23, 1962, which is a continuation-in-part of application Serial No. 788,432, filed January 22, 1959, now abandoned, which in turn is a continuation-in-part of application Serial No. 616,161, filed October 16, 1956 now abandoned.

In general the present invention is useful wherever a spray of liquid is required. One primary field of utility resides in apparatus for projecting one or more sprays of liquid across a moving stream of gas to make repeated renewal of large areas of fresh liquid surfaces to effect intimate contact with the gas.

The liquid spraying impellers which heretofore have been available to the art have been characterized by a variety of disadvantages. For example, rotating discs with teeth or scoops on their periphery do not move sufficient liquid when operated at slow speed and at high speeds they tend to create a mist which becomes entrained in a moving stream of gas. Moreover, at any speed, such impellers tend to project a highly non-uniform spray with most of the output limited to the rising side of the impeller.

It has also been proposed to utilize a hollow impeller having a thin perforated wall at its periphery so that liquid may be admitted in an axial direction inside of the hollow impeller and projected by centrifugal force outwardly through the thin perforated rim. Known structures of this type, however, have not retained sufficient liquid in the impeller over its entire periphery to effect a substantially uniform spray from all points on the exposed periphery. Moreover, such structures have been characterized by low capacity and lack of control of the velocity and droplet size of the spray.

To overcome the disadvantages of the prior art, an object of the present invention is to provide a liquid spraying apparatus utilizing a high capacity rotary impeller which projects a copious uniform spray at velocities and droplet sizes within acceptable limits.

Another object of the invention is to provide such an apparatus which not only has high performance capabilities but is inexpensive to make and use.

In general, the invention relates to a liquid spraying apparatus which comprises a rotatable impeller having a cavity inside of said impeller, an annular rim bordering said cavity and an opening in an end face of said impeller to admit liquid into said cavity, and means in said rim to receive a substantial volume of liquid from said cavity and to retard and effect a plurality of direction changes in the outward centrifugal flow of said liquid when the impeller is rotated so that said liquid is sprayed substantially uniformly from the entire exposed periphery of said impeller, said means including a plurality of elongated tortuous passages extending through said rim to connect said cavity with said periphery.

The invention having been generally described several illustrative specific embodiments thereof will now be set forth in detail with reference to the accompanying drawings in which:

FIGURE 1 is a vertical section taken longitudinally through a gas-liquid contact device embodying apparatus according to the invention;

FIGURE 2 is a fragmentary front detail showing of an impeller disc and illustrating the relationship between two adjoining discs;

FIGURE 3 is a view similar to FIGURE 2 showing a portion of one of the outer impeller discs;

FIGURE 4 is a fragmentary vertical section taken through the impeller rim showing the flow path through the impeller discs;

FIGURE 9 is a vertical section taken through a modified form of impeller utilizing alternating wide and narrow discs with the latter wholly inside of the former;

FIGURE 12 is a plan view of a trough which surrounds the lower portion of the impeller;

FIGURE 13 is a vertical section taken along the line 13—13 of FIGURE 12;

FIGURE 14 is a transverse vertical section showing an impeller according to the invention mounted in a gas-liquid contact tube and illustrating the uniform spray pattern which is produced;

Figure 5:
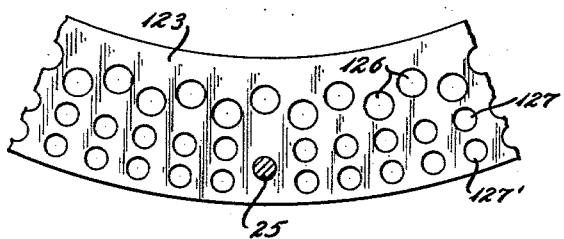
FIGURE 5 is a fragmentary front detail of a modified form of inner disc.
Figure 7:
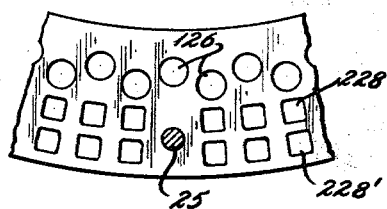
FIGURE 7 is a fragmentary front detail of a still further modified form of inner disc.
Figure 6:
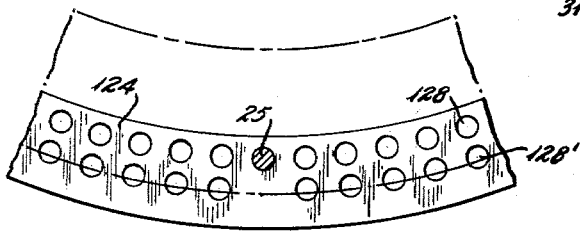
FIGURE 6 is a fragmentary front detail of a modified form of outer disc.
Figure 11:
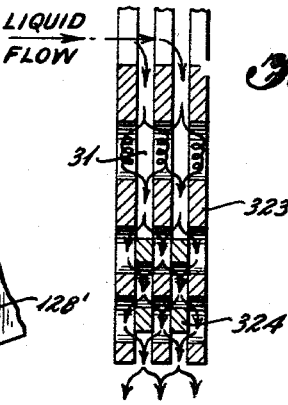
FIGURE 11 is a vertical section taken through the impeller of FIGURE 9 showing the cooperation between and liquid flow through the impeller discs.
Figure 10:
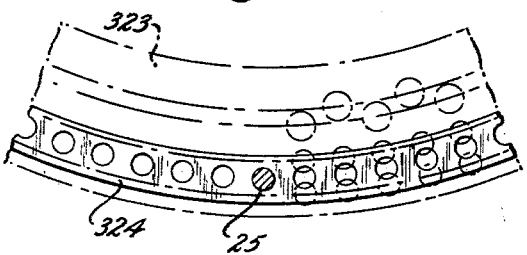
FIGURE 10 is a fragmentary front detail of a pair of adjoining wide and narrow dscs of FIGURE 9.
Figure 8:
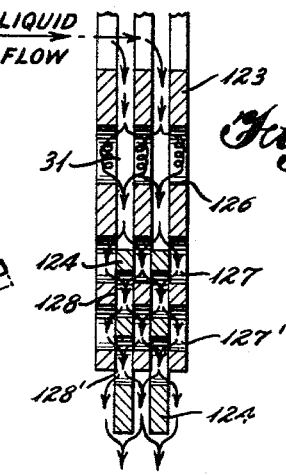
FIGURE 8 is a vertical section showing the cooperation between and the flow path through the impeller discs of FIGURES 5 and 6.
Figure 15:
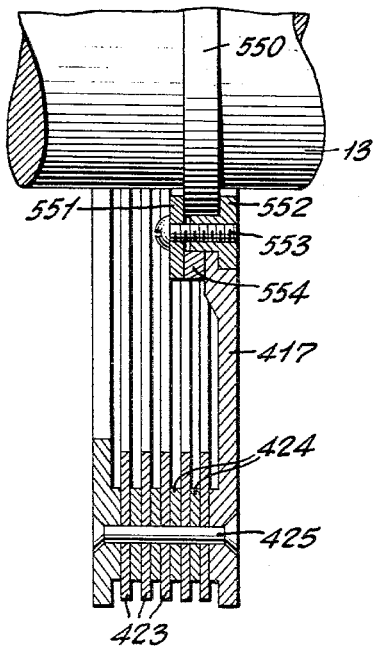
FIGURE 15 is a vertical section taken through still another modified form of impeller.
Figure 16:
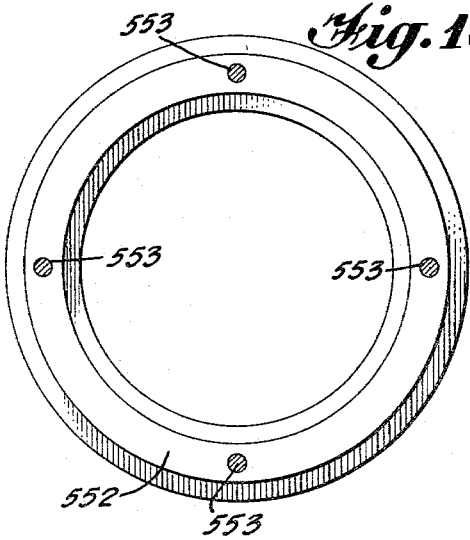
FIGURE 16 is an end view of the shaft connection for the impeller shown in FIGURE 15.
Figure 17:
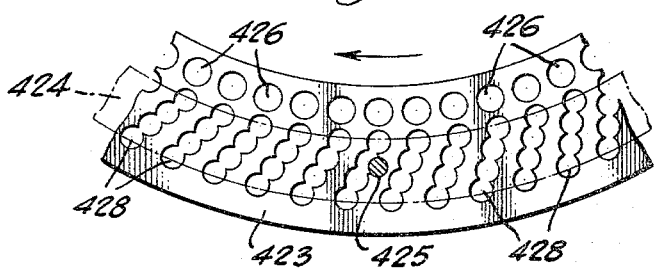
FIGURE 17 is a fragmentary front detail of a pair of adjoining wide and narrow discs of the impeller of FIGURE 15.
Figure 18:
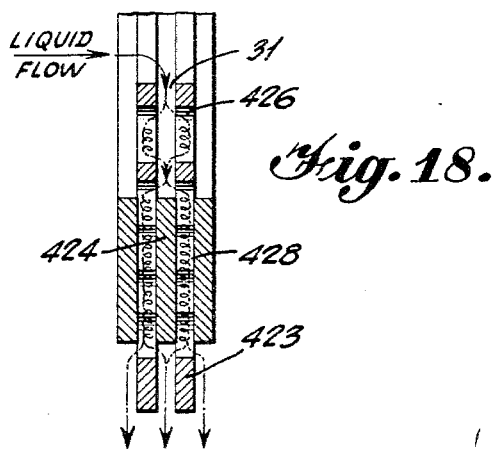
FIGURE 18 is a vertical section showing the cooperation between and the flow path through the impeller discs of FIGURES 15-17.

Illustrated in FIGURE 1 is a fragmentary section of an elongated horizontal tube 11 which forms a part of a gas-liquid contact apparatus as fully shown and described in my said co-pending application Serial No. 216,008, the disclosure of which is incorporated herein by reference. While it is not necessary to repeat here all of the details of such gas-liquid contact apparatus, a brief explanation should facilitate a better understanding of the present invention.

A cross sectional view of the tube 11 is shown in FIGURE 14. Mounted in the lower portion of the tube are a plurality of horizontally spaced impellers 12, only one of which is shown. Each impeller 12 is fixed to a shaft 13 which extends longitudinally in the tube 11 and is journalled for rotation in suitable bearings at opposite ends of the tube. The shaft and impellers are positioned in the lower portion of the tube 11 so as to leave in the upper portion of the tube a large crescent shaped passageway 14 (FIGURE 14) through which gas to be contacted is moved horizontally as more fully described in application Serial No. 216,008. The impellers 12 when they are rotated project a plurality of spaced spray curtains of liquid across the passageway 14 for intimate contact with the gases flowing therethrough. Preferably, as described in said co-pending application, the flow of liquid in the tube from impeller to impeller is counter-current to the flow of gas through the tube. The liquid after being sprayed across the passageway 14 coalesces on the upper and side walls of the tube 11 and flows downwardly to the bottom of the tube between guide members 15. A portion of the returning liquid is directed downstream to the next succeeding impeller and another portion is returned to the same impeller from which it was last projected. Various specific arrangements as shown in application Serial No. 216,008 may be utilized to control the extent of recirculation of liquid after projection from the individual impellers.

Each of the impellers 12 includes a front plate 16 and a back plate 17 which is fixed to the shaft 13 by tapered split rings 18 and threaded fasteners 19. However, other suitable means may be employed to connect the impeller to the shaft instead of the specific arrangement shown in FIGURE 1. The impeller 12 is hollow with a large opening 20 in its front face leading into a large cavity 21 which extends between the shaft 13 and the impeller rim 22. When the impeller is in use, liquid flows axially through the opening 20 into the lower portion of the cavity 21. The rim 22 has its front face formed by the front plate 16 and includes a plurality of overlapping inner plates in the form of annular discs 23 and outer plates in the form of annular discs 24 which are connected to contiguous face-to-face relationship between the plates 16 and 17 by rivets 25 or other suitable fasteners.

Each of the inner discs 23 has a series of holes 26 on an inner portion of the disc and a second plurality of holes 27 in an outer portion of the disc. The outer discs 24 have a series of spaced holes 28. The holes 26, 27 and 28 preferably consist of through openings uniformly spaced around the entire circumference of their respective discs. The openings 27 and 28 may take the form of elongated slots having scalloped edges as shown in FIGURES 2 and 3 which slots are inclined outwardly in the direction of rotation of the impeller. As best shown in FIGURE 4 the inside radius of each of the outer discs 24 is slightly greater than the radius of a circle coinciding with the inner ends of the openings 27 in the inner discs 23. Thus an elongated straight passage 31 is defined between each adjoining spaced pair of discs 23, such passage extending from the inner edge of such discs 23 to the inner edge of the disc 24 which is held between the discs 23. The passages 32 form continuous annular channels and are substantially unobstructed through their radial length. Because the inner edge of the disc 24 is outwardly of the inner edge of the openings 27 in the disc 23, liquid is free to flow from the cavity 21 outwardly through the passages 31 and then axially into the openings 27 on both sides of the inner edge of each disc 24. Such flow is illustrated in FIGURE 4 and occurs as a result of centrifugal force when the impeller is rotated. The inner edge of the openings 28 are positioned radially inwardly of the outer edge of the openings 27. Consequently, the liquid is free to flow from the openings 27 into the openings 28 in an axial direction opposite to that in which it flowed into the openings 27. The radially outer edge of the openings 28 are positioned outwardly of the radially outer edge of the disc 23. Accordingly, the liquid in the openings 28 again reverses its axial direction and flows into channels 32 which lie between the discs 24 outwardly of the discs 23. Probably most of the liquid flow in the channels 32 is along the faces of the outer edges of the discs 24 from which the liquid is projected tangentially outwardly from the periphery of the impeller.

It can thus be seen that the relationship between the perforated discs 23 and 24 including the overlapped staggered relation of the openings 27 and 28 provides a plurality of elongated tortuous passages extending through the rim of the impeller to connect the cavity 21 with the impeller periphery. A substantial volume of liquid may be received in the passages between the discs and, as such liquid moves centrifugally outwardly it is forced to undergo a plurality of direction changes. The tortuous path throught the impeller rim sufficiently retards the flow of liquid to afford the impeller time to rotate a substantial distance while the liquid is passing from the cavity to the periphery of the impeller. Such retardation of flow results in the projection of a substantially uniform spray pattern from the entire exposed periphery of the impeller 12 as illustrated in FIGURE 14. In the absence of such retardation, most of the liquid would be projected on the rising side of the impeller and there would be little liquid left to be projected from the top or the descending side of the impeller. As a result the spray pattern would be concentrated in the lower left hand corner of the passageway 14 as shown in FIGURE 14.

Moreover, the liquid is projected as droplets of a sufficient size as to be substantially non-entraining in a moving stream of gas in the passageway 14. Manifestly, droplet size will vary depending upon such factors as the particular size of the openings in the discs, the spacing between the discs and the speed of rotation of the impeller. Increased speed of a given impeller structure increases the fineness of the spray. Very fine spray is not necessary or desirable. A characteristic of the spray produced with this apparauts is that the droplet sizes for any particular operating condition are relatively uniform as compared with the non-uniform size distribution in sprays produced by other means such as high pressure spray nozzles or the like. It has been found that droplet sizes within the range from 0.1 mm. to 2 mm. in diameter are satisfactory for most operations.

The desired droplet size can be obtained when using impellers of a particular size and design by operating the impellers at an appropriate speed of rotation. Impellers of different diameters produce approximately equivalent sprays when operated respectively at the same peripheral velocity. The preferred range of speeds of rotation is such that the values of peripheral velocity in feet per second lie in the range between 18 and 50. Below this range the spray is not sufficiently energetic and uniform to make a good spray pattern across the hollow vapor space. Above this range the spray impinges too violently on the tube wall with a resulting tendency to production of the fine lateral spray and entraining in the stream of vapor. Moreover, power consumption becomes undesirably high above the preferred range. Especially preferred is a peripheral velocity range between 25 and 40 feet per second.

It has been found that provision of a relatively straight passage, such as the channels 31, immediately after the liquid leaves the impeller cavities is desirable to permit rapid acceptance of large quantities of liquid into the impellers. Thus, the inner edges of the discs 24, which mark the beginning of the tortuous portion of the liquid path through the impeller rim, preferably are spaced outwardly of the inner ends of the discs 23. For certain operations, however, a passageway tortuous throughout the impeller rim would be satisfactory.

Further, if desired, the perforations 26 in the discs 23 may be omitted. It has been found, however, that better performance occurs when such perforations are utilized. Apparently the perforations 26 provide an additional storage compartment for the liquid thus enabling greater and fastener acceptance of liquid by the rim of the impeller from the cavity. Such perforations also provide communication between the passages 31 thereby facilitating equalization of flow through the rim among the different passages. Moreover, the perforations 26 tend to increase the turbulence of flow through the passages 31 as illustrated in FIGURE 4.

The lower portion of the impeller 12 is enclosed in a trough 41 which closely surrounds the impeller. The trough 41 has a front wall 42, a rear wall 43 and a generally arcuate bottom 44 to conform generally to the peripheral configuration of the impeller. The front wall 42 is provided with a weir 45 which preferably has an arcuate configuration corresponding to the arcuate shape of the interior of the rim 22. In other words, the weir 45 and the opening 20 into the cavity 21 of the impeller preferably have the same radius and are coaxial with each other. Thus, liquid flowing across the weir 45 is smoothly directed into the cavity 21 for projection by the impeller in the manner previously described. However, it is not essential that the respective shapes of the weir and the impeller opening be identical. Indeed, the trough opening need not necessarily be a weir. For example, an orifice could be employed.

Desirably the periphery of the impeller effects little or no exterior pickup of liquid from inside of the trough 41. Substantially all of the liquid which is sprayed is that which is deposited inside of the impeller cavity and moves centrifugally outwardly through the elongated tortuous passages in the impeller rim.

Preferably the bottom 44 of the trough 41 is flared away from the impeller periphery on the outlet side of the impeller as shown at 46 in FIGURES 13 and 14. The flare 46 allows more effective removal from the trough of the liquid that has been sprayed into the trough by the impeller. Moreover, the flared portion 46 prevents overloading of the impeller with liquid as it emerges from the trough. Further, it has been found that performance is improved where one or more narrow vanes extending in the direction of movement of the impeller are positioned at spaced locations in the bottom of the flared portion 46 of the trough. In the illustrated embodiment of the trough a plurality of such vanes 47 are employed. The use of such vane or vanes further facilitates handling the excess liquid which is sprayed from the impeller into the trough.

Modified forms of impeller discs are shown in FIGURES 5 and 6. The disc 123 shown in FIGURE 5 corresponds to the disc 23 and the disc 124 shown in FIGURE 6 corresponds to the disc 24. The discs 123 and 124 are identical to their counterparts 23 and 24 except that the former are characterized by a plurality of pairs of round openings spaced apart on radial lines, rather than single inclined slots, in their overlapping portions. Specifically, the disc 123 has pairs of spaced openings 127 and 127'. The disc 124 has pairs of spaced openings 128 and 128'. The openings 127 and 127' in the discs 123 are placed in overlapping staggered relation with the openings 128 and 128' of the discs 124 in the same general relationship as that between the openings 27 and 28 to provide a tortuous passageway for the centrifugal flow of liquid through the impeller rim.

It will be understood that the openings in any of the various forms of discs illustrated herein are not limited to any particular shape such as the elongated slots as shown in FIGURES 2 and 3 or the circular openings shown in FIGURES 5 and 6. A variety of other shapes may be utilized. For example, the openings may be substantially square with rounded edges as shown at 228 and 228' in FIGURE 7. Indeed, the particular configuration shown in FIGURE 7 is preferred.

In the embodiments described thus far there have been one set of inner discs and an overlapping set of outer discs which extend radially outwardly beyond the outer edges of the inner discs. If desired, however, there may be one set of very wide discs 323 and one set of very narrow discs 324 as illustrated in FIGURES 9, 10 and 11. In this arrangement the discs 323 extend beyond the discs 324 on both the radially inner and outer edges of the latter. The overlapping staggered relation between the openings in the discs 324 and 323 is the same as that of the previously described embodiments.

A further modified form of impeller which is simple to fabricate yet highly effective is shown in FIGURES 15–18. The back plate 417 of such impeller is mounted to the shaft 13 by a connection alternative to that of FIGURE 9. Either of these connections or others may be employed with respect to any of the various impeller embodiments. The shaft 13 has a circumferential ridge 550 which may be integral with the shaft or take the form of an inserted key. This ridge may encompass all or a portion of the circumference of the shaft. A pair of mating annular rings 551 and 552 are connected together by a series of threaded fasteners 553 to grip the protrusion 550 between the rings. The inside face of ring 552 is shown in FIGURE 16. The outer edges of the rings 551 and 552 grip the inner end of the back plate 417, which is grooved to receive the disc 552 and a spacer 554.

The impeller shown in FIGURES 15–18 like that of FIGURE 9, has a plurality of very wide discs 423 and a plurality of narrow discs 424. The discs 423 extend beyond both the radially inner and outer edges of the discs 424. Unlike any of the previously described inner discs, however, the discs 424 are continuous and unperforated except for holes accommodating the rivets 425. In order to carry liquid radially past the discs 424, the discs 423 are provided with a plurality of elongated slots 428 which extend radially beyond both edges of the discs 424. Thus, as shown in FIGURE 18, liquid is free to bypass the discs 424 by flowing in a tortuous path into, through and out of the slots 428. As shown in FIGURE 17, the slots 428 are inclined outwardly in the direction of rotation of the impeller. The slots 428 also have scalloped edges, best seen in FIGURE 17, which increase the resistance to flow through the slots. The irregular or scalloped edges of the slots provide a marked improvement in the performance of the impeller.

The discs 423 are also provided inwardly of the discs 424 with openings 426 which have the same function as the openings 26 of the discs shown in FIGURES 1–4.

There have been shown and described what are considered to be illustrative embodiments of the invention. It will be understood, however, that various modifications may be made by persons skilled in the art without departing from the scope of the invention which is defined solely by the appended claims.

I claim:

1. An apparatus for spraying a curtain of liquid droplets through a stream of moving gas which comprises a rotatable impeller, means supporting said impeller for rotation about a generally horizontal axis, said impeller having a cavity inside thereof, a pair of spaced plates defining front and rear faces of said impeller, said front plate defining an inlet to admit liquid axially into said cavity, a plurality of contiguous members positioned between said plates to form a rim outside of said cavity, said plates and said members being connected together against rotation relative to each other, said members defining a plurality of elongated tortuous passages extending through said rim from said cavity to the impeller periphery to retard and effect a plurality of direction changes in the outward and upward centrifugal flow of said liquid when the impeller is rotated so that said liquid is sprayed substantially uniformly from the entire exposed periphery of said impeller, said passages including openings in at least some of said members extending transverse to radial direction.

2. An apparatus as recited in claim 1 further comprising a trough surrounding the lower portion of said impeller, said trough having an axial inlet in communication with said impeller inlet.

3. An apparatus as recited in claim 2 wherein said passages have straight inner portions and tortuous outer portions.

4. An apparatus as recited in claim 2 further comprising means to rotate said impeller at a velocity relative to the size of said passages to emit droplets of sufficient size to be substantially nonentrained in the moving gas.

5. An apparatus as recited in claim 4 wherein said rotating means moves said impeller at a peripheral velocity from 18 to 50 feet per second.

6. An apparatus as recited in claim 4 wherein said rotating means moves said impeller at a velocity to project droplets having a diameter of from 0.1 to 2 mm.

7. An apparatus as recited in claim 4 wherein the bottom of said trough generally conforms to the peripheral configuration of said impeller, said bottom flaring away from the impeller periphery at the outlet side of said trough, said flared portion of said bottom having elongated vane means thereon parallel to the rotational movement of the impeller.

8. An apparatus as recited in calim 4 wherein said passages have straight inner portions and tortuous outer portions.

9. A liquid spraying apparatus which comprises a rotatable impeller having a generally horizontal axis of rotation, said impeller having
a cavity inside of said impeller,
an opening in an end face of said impeller to admit liquid axially into said cavity, and
an annular rim bordering said cavity, said rim including
a plurality of spaced plates defining generally radial passages for centrifugal flow of liquid when said impeller is rotated, said passages being substantially straight over an inner portion of said plates, at least an outer portion of said plates having transverse holes therein, and
means radially spaced from the inner edges of said plates and situated between said outer portions and cooperating with said holes to direct the liquid in tortuous paths extending into said holes and to retard the flow of said liquid to the outer periphery of said impeller so that said liquid is sprayed substantially uniformly from the entire exposed periphery of said impeller.

10. An apparatus as recited in claim 9 wherein
said plates comprise annular discs lying in a plane transverse to the axis of rotation of said impeller and
said means comprises a plurality of annular discs having
a larger inside diameter than said plates and
a plurality of transverse holes in overlapped staggered relation with said holes in said plates.

11. A liquid spraying apparatus which comprises
an impeller rotatable about a generally horizontal axis, said impeller having
a cavity inside of said impeler,
an opening in an end face of said impeller to admit liquid axially into said cavity, and
an annular rim bordering said cavity, said rim including
a plurality of spaced plates defining generally radial passages for centrifugal flow of liquid when said impeller is rotated, said passages being substantially straight over an inner portion of said plates, at least an outer portion of said plates having transverse holes therein, and
means radially spaced from the inner edges of said plates and situated between said outer portions and cooperating with said holes to direct the liquid in tortuous paths extending into said holes and to retard the flow of said liquid to the outer periphery of said impeller so that said liquid is sprayed substantially unformly from the entire exposed periphery of said impeller, and
a trough having
a bottom and upright walls surrounding the lower portion of said impeller and
an inlet in communication with said impeller opening.

12. An apparatus as recited in claim 11 wherein
said plates comprise annular discs lying in a plane transverse to the axis of rotation of said impeller and
said means comprise a plurality of annular discs having
a larger inside diameter than said plates and
a plurality of transverse holes in overlapped staggered relation with said holes in said plates.

13. An apparatus as recited in claim 11 wherein the bottom of said trough generally conforms to the peripheral configuration of said impeller, said bottom flaring away from the impeller periphery at the outlet side of said trough.

14. An apparatus as recited in claim 12 wherein the bottom of said trough generally conforms to the peripheral configuration of said impeller, said bottom flaring away from the impeller periphery at the outlet side of said trough.

15. An apparatus as recited in claim 13 wherein the flared portion of said bottom has vane means thereon parallel to the rotational movement of the impeller.

16. An apparatus as recited in claim 14 wherein the flared portion of said bottom has vane means thereon parallel to the rotational movement of the impeller.

17. A liquid spraying apparatus which comprises a rotatable impeller having a generally horizontal axis of rotation, said impeller having
a cavity inside of said impeller,
an opening in an end face of said impeller to admit liquid into said cavity, and
an annular rim bordering said cavity, said rim including
a plurality of contiguous plates, adjoining ones of said plates having overlapped staggered transverse holes to provide a plurality of tortuous passages extending generally radially through said rim to connect said cavity with said periphery so that when said impeler is rotated centrifugal flow of liquid through said passages is retarded to provide a substantially uniform spray from the entire exposed periphery of said impeller.

18. A liquid spraying apparatus as recited in claim 17 wherein said plates comprise annular discs lying in a plane transverse to the axis of rotation of said impeller.

19. A liquid spraying apparatus which comprises
an impeller rotatable about a generally horizontal axis, said impeler having
a cavity inside of said impeller,
an opening in an end face of said impeller to admit liquid axially into said cavity, and
an annular rim bordering said cavity, said rim including
a plurality of contiguous annular discs adjoining ones of said discs having overlapped staggered transverse holes to provide a plurality of tortuous passages extending generally radially through said rim to connect said cavity with said periphery so that when said impeller is rotated centrifugal flow of liquid through said passages is retarded to provide a substantially unform spray from the entire exposed periphery of said impeller, and
a trough having
a bottom and upright walls surrounding the lower portion of said impeller and
an inlet in communication with said impeller opening.

References Cited by the Examiner

UNITED STATES PATENTS

| | | | |
|---|---|---|---|
| 1,667,291 | 4/28 | Lavett | 239—220 |
| 1,870,099 | 8/32 | Croan | 239—223 |
| 1,948,278 | 2/34 | Payne et al. | 239—220 |
| 2,959,357 | 11/60 | Geller | 239—220 |

FOREIGN PATENTS

| | | |
|---|---|---|
| 761,881 | 1/34 | France. |
| 876,066 | 8/61 | Great Britain. |

LOUIS J. DEMBO, *Primary Examiner.*

EVERETT W. KIRBY, *Examiner.*